(12) United States Patent
Imine

(10) Patent No.: US 9,766,845 B2
(45) Date of Patent: Sep. 19, 2017

(54) OPERATING DEVICE, AND CONTROLLING METHOD OF CHANGING POSITION OF DISPLAYED IMAGES BASED ON RECEIVING A PRINT INSTRUCTION

(71) Applicant: CANON KABUSHIKI KAISHA, Tokyo (JP)

(72) Inventor: Ryotaro Imine, Toride (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/030,826

(22) PCT Filed: Dec. 11, 2014

(86) PCT No.: PCT/JP2014/083492
§ 371 (c)(1),
(2) Date: Apr. 20, 2016

(87) PCT Pub. No.: WO2015/088041
PCT Pub. Date: Jun. 18, 2015

(65) Prior Publication Data
US 2016/0259607 A1    Sep. 8, 2016

(30) Foreign Application Priority Data

Dec. 13, 2013   (JP) .................. 2013-258059

(51) Int. Cl.
*G06F 3/12* (2006.01)
*G06F 3/0488* (2013.01)
(Continued)

(52) U.S. Cl.
CPC ....... *G06F 3/1256* (2013.01); *G03G 15/5016* (2013.01); *G06F 3/0488* (2013.01);
(Continued)

(58) Field of Classification Search
CPC ........ G06F 17/212; G06F 17/243; G06F 3/00; G06F 3/1256; G06F 3/04845;
(Continued)

(56) References Cited

U.S. PATENT DOCUMENTS 8,966,364 B2    2/2015  Ogino
2006/0146363 A1*  7/2006  Choi .................. H04N 1/00278
358/1.15
(Continued)

FOREIGN PATENT DOCUMENTS

JP    2010-52292    3/2010
JP    2012-29012    2/2012
(Continued)

OTHER PUBLICATIONS

International Preliminary Report on Patentability issued Jun. 23, 2016 in International application No. PCT/JP2014/083492.

*Primary Examiner* — Jamares Q Washington
(74) *Attorney, Agent, or Firm* — Fitzpatrick, Cella, Harper & Scinto

(57) ABSTRACT

In order to be able to accept, on a preview display, operation to cope with various situations when using an image forming apparatus, an operating device comprises: a displaying unit configured to display a plurality of images within a preview display area; an accepting unit configured to accept a printing instruction for the image displayed by the displaying unit; and a display controlling unit configured to, in linkage with a printing performing state based on the printing instruction, display the images such that a partial image of the plurality of images is discharged from the preview display area and other image in the plurality of images is moved within the preview display area.

18 Claims, 12 Drawing Sheets

(51) Int. Cl.
  *G06F 3/0484* (2013.01)
  *H04N 1/00* (2006.01)
  *G03G 15/00* (2006.01)
  *B41J 3/46* (2006.01)

(52) U.S. Cl.
  CPC ........ *G06F 3/04845* (2013.01); *G06F 3/1203* (2013.01); *G06F 3/1208* (2013.01); *G06F 3/1263* (2013.01); *G06F 3/1292* (2013.01); *H04N 1/0044* (2013.01); *H04N 1/00381* (2013.01); *H04N 1/00411* (2013.01); *H04N 1/00445* (2013.01); *H04N 1/00474* (2013.01); *H04N 1/00477* (2013.01); *B41J 3/46* (2013.01); *H04N 2201/0094* (2013.01)

(58) Field of Classification Search
  CPC . G06F 3/0488; G06F 3/1263; H04N 1/00445; H04N 1/00477
  USPC ............ 358/1.15, 1.5, 1.9; 399/81; 715/204, 715/210, 274, 277
  See application file for complete search history.

(56) References Cited

U.S. PATENT DOCUMENTS

2007/0171450 A1* 7/2007 Yoshida .............. G06F 3/04817
                                                    358/1.13
2012/0131452 A1   5/2012 Ogino
2013/0222305 A1* 8/2013 Kanno .................. G06F 3/0484
                                                    345/173

FOREIGN PATENT DOCUMENTS

JP    2012-74810    4/2012
JP    2013-140554   7/2013

* cited by examiner

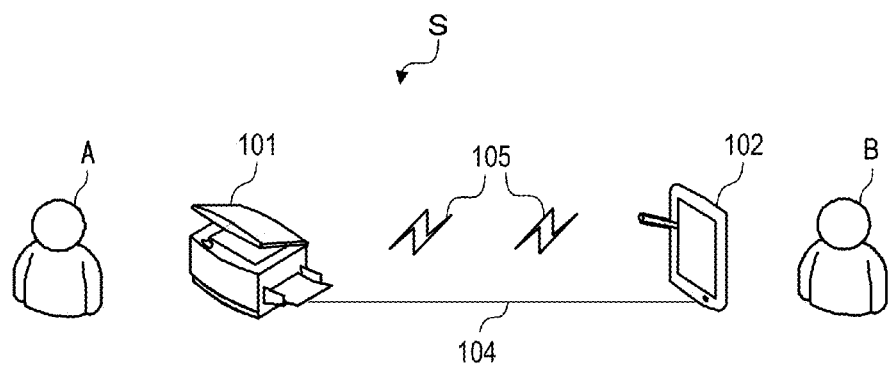
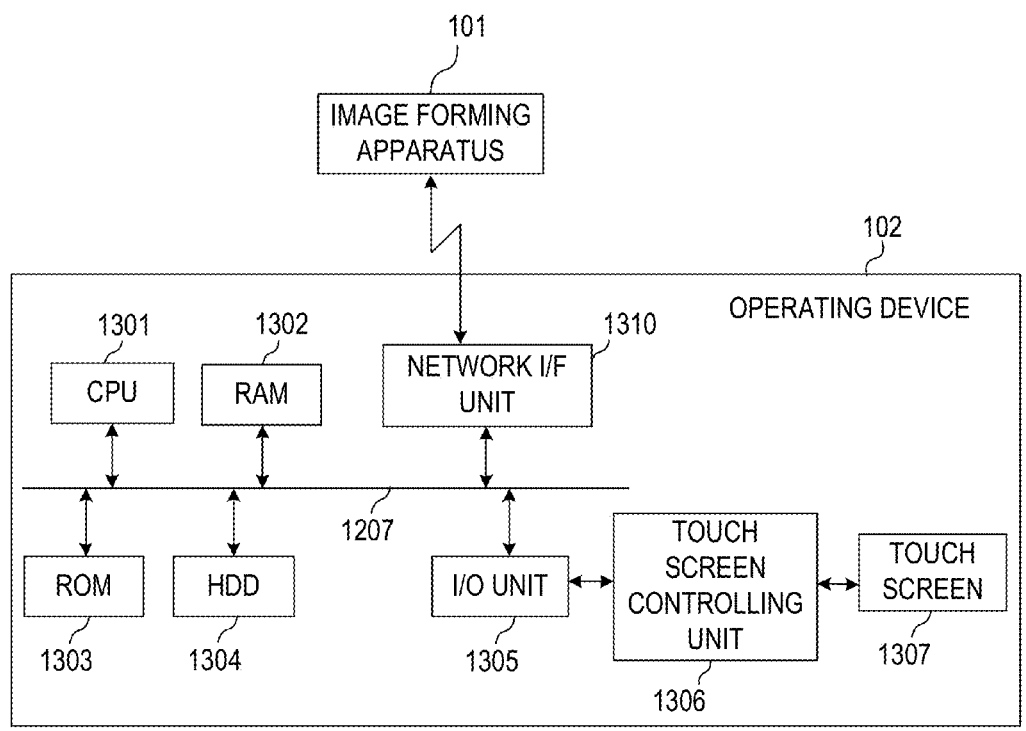

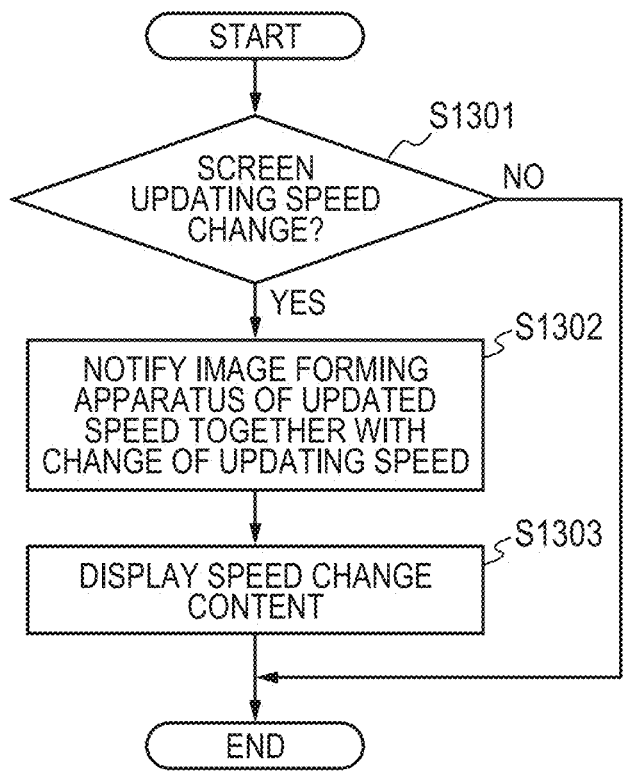

OPERATING DEVICE, AND CONTROLLING METHOD OF CHANGING POSITION OF DISPLAYED IMAGES BASED ON RECEIVING A PRINT INSTRUCTION

This application is a national stage application under 35 U.S.C. §371 of International Application No. PCT/JP2014/083492, having an International filing date of Dec. 11, 2014, which claims priority to Japan 2013-258059, filed on Dec. 13, 2013, the contents of each of which are incorporated by reference as if set forth in full herein.

TECHNICAL FIELD

The present invention relates to an image forming apparatus which can change a printing job through a preview display screen, a controlling method of the image forming apparatus, a computer program for the controlling method, an operating device which accepts the change of the printing job, and an image forming system which includes the image forming apparatus and the operating device. Particularly, the present invention relates to control of the printing job such as performing, interrupting and cancelling of a printing process, restart of printing from jam occurrence, or the like, on the preview display screen.

BACKGROUND ART

Conventionally, in operation settings in a general image forming apparatus, information necessary for job setting is confirmed and an operation input is accepted through an operation unit which is provided on the body of the image forming apparatus and has a display screen such as a touch panel. As for the operation input, there is an apparatus which can detect a flick operation defined by a touch position (touch coordinates) on the touch panel and its locus.

Incidentally, the information to be confirmed by a user through the display screen indicates, for example, a job performing instruction of copying, facsimile transmission or the like, detailed setting of such a job, a content of a preview display (pre-printing display) of a printed result image, or the like. Further, as the operation input from the user, for example, a control instruction such as a job performing instruction, a detailed setting changing instruction (e.g., a mode changing instruction, a printing number changing instruction, or the like), an active (in-performing) job interrupting instruction, or the like is accepted.

Incidentally, in a multi-functionalized image forming apparatus, "simplicity" in operation settings necessary to efficiently use various functions thoroughly is one of indexes indicating product's values. For example, enlargement of the display screen size, arrangement or enlargement of the selection buttons, an expression method using color and animation, and the like are adopted to achieve as "simplicity". In addition, there is an apparatus which enables to accept flick operations to have affinities with operation feelings of widely-used smartphones, tablet PCs (personal computers) and the like.

As just described, "simplicity" of the operation which aims to enable a user to perform setting and printing for obtaining a finish that he/she envisions is required for the image forming apparatus.

The image forming apparatus described in PTL 1 enables a user to obtain a print output material as quickly as possible while he/she is confirming it. More specifically, the image forming apparatus displays images to be print-output page by page while continuing image forming. In other words, the image forming apparatus performs such a live view display, and also stops the print output if a stop input is accepted during the image forming.

CITATION LIST

Patent Literature

PTL 1: Japanese Patent Application Laid-Open No. 2010-52292

SUMMARY OF INVENTION

Technical Problem

However, the image forming apparatus described in the PTL 1 enables the user to accept the printing stop while confirming each page of the image to be print-output from now. That is, the image forming apparatus performs the image display (preview display) in linkage with the image forming of each page. Consequently, there is a problem that it is impossible to perform a preview display in correspondence with print settings for double-sided printing, 2-in-1 reduction layout printing or the like by which images of a plurality of pages are formed on one paper.

Further, on the preview display, for example, it is impossible to accept instructions, such as a recovery instruction at a time of occurrence of a paper jam, a printing restart instruction from an arbitrary page, and the like, which aim to cope with various situations that the user encounters and to have a desirable finish.

The present invention has been completed in consideration of such problems as described above, and an object of the present invention is to provide the image forming apparatus which can accept, on the preview display, the operations to cope with various situations occurred when the image forming apparatus is used.

Solution to Problem

An operating device according to the present invention comprises: a displaying unit configured to display a plurality of images within a preview display area; an accepting unit configured to accept a printing instruction for the image displayed by the displaying unit; and a display controlling unit configured to, in linkage with a printing performing state based on the printing instruction, display the images such that a partial image of the plurality of images is discharged from the preview display area and other image in the plurality of images is moved within the preview display area.

Advantageous Effects of Invention

According to the present invention, a display content including a preview image displayed on a display screen is updated in linkage with a performing state of a printing job. Besides, it is possible to identify the operation content for the preview image displayed on the display screen and change the content of a printing job to be performed from now according to the identified operation content. Thus, it is possible to accept operations to cope with various situations which occur when an image forming apparatus is used. Further, it is possible for a user to instruct a change of the content of the printing job while intuitively grasping the performing state of the printing job by visually confirming the display screen.

Further features of the present invention will become apparent from the following description of exemplary embodiments with reference to the attached drawings.

BRIEF DESCRIPTION OF DRAWINGS

FIG. 1 is a diagram illustrating an example of the entire configuration of an image forming system S.

FIG. 2 is a block diagram illustrating an example of the hardware constitution of an operating device according to an embodiment.

FIG. 14 is a flow chart for indicating in detail a processing procedure to be performed when the updating speed is changed.

DESCRIPTION OF EMBODIMENTS

Figure 3:
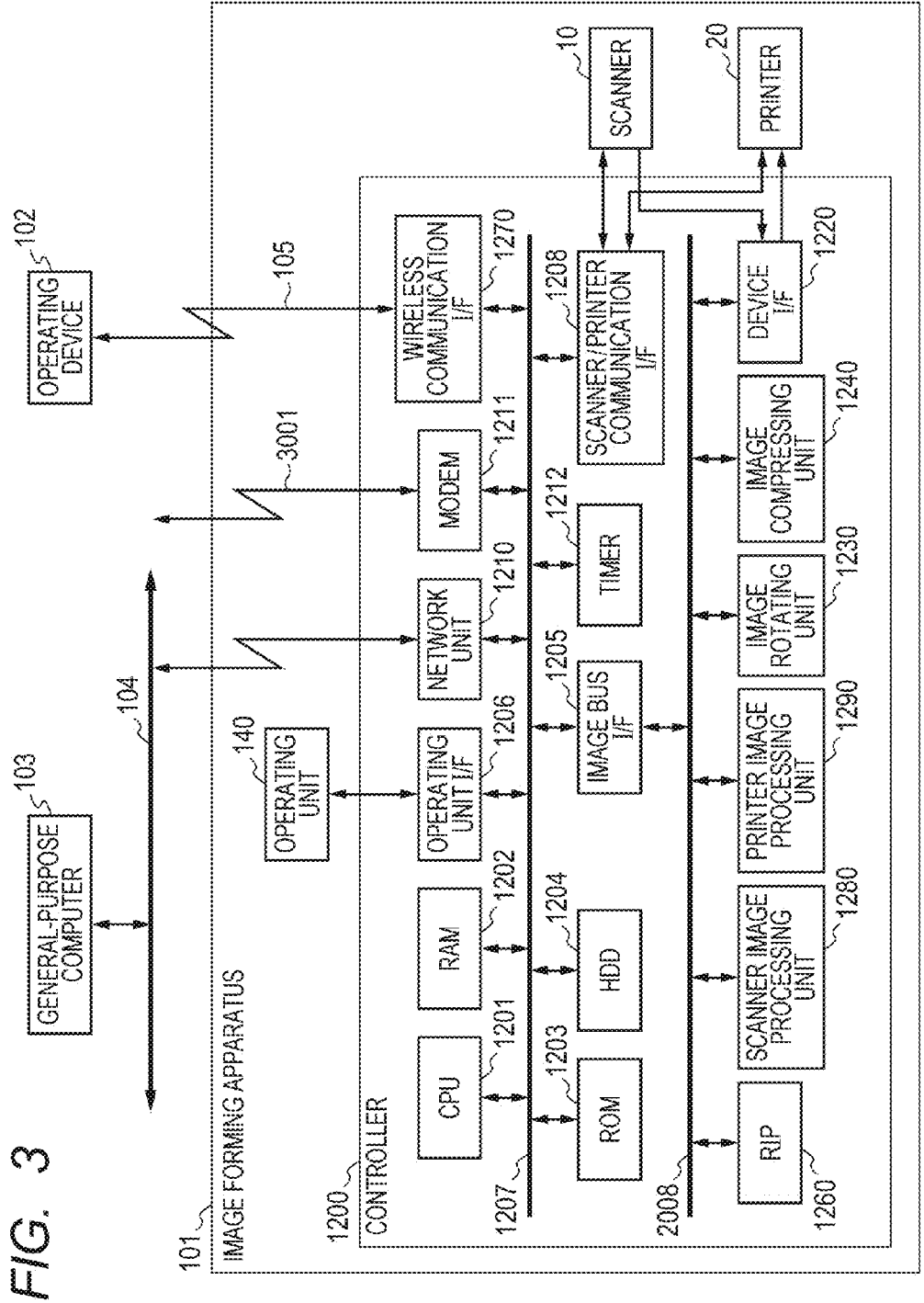
FIG. 3 is a block diagram illustrating an example of the hardware constitution of an image forming apparatus according to the embodiment.

Hereinafter, embodiments of the present invention will be described with reference to the attached drawings.

FIG. 1 is a diagram illustrating an example of the entire configuration of an image forming system S which includes an image forming apparatus and an operating device according to the present embodiment. The image forming system S is constituted by including, for example, a printer, a facsimile apparatus or an image forming apparatus 101, which serves as a multifunction apparatus having functions of the printer and the facsimile apparatus, and an operating device 102 which can perform interactive communication with this image forming apparatus 101.

The operating device 102 is a personal digital assistant such as, for example, a smart phone, a tablet PC or the like, in which a job controlling program used for controlling various jobs to be performed by the image forming apparatus 101 is executably installed. The operating device 102 also may be a detachable operating unit previously provided at the image forming apparatus 101. The image forming apparatus 101 and the operating device 102 are communicatably connected with each other through a wired LAN network 104 or a wireless LAN network 105.

The description will be continued on the premise that a user performs the control of various jobs, which are performed by the image forming apparatus 101, by using the operating device 102. In addition, it will be described in detail by exemplifying a printing job.

A control of a printing job, for example, the performing, interruption, cancellation or the like of the printing, to be performed by the image forming apparatus 101, is performed by a process that the user operates a preview image displayed on a display screen provided at the operating device 102. The details will be described later.

In the image forming system S according to the present embodiment, both a user A, who directly operates the image forming apparatus 101, and a user B, who operates the image forming apparatus 101 through the operating device 102, can perform a necessary job control while confirming progress of a printing job.

Hereinafter, the details of specific configurations of the image forming apparatus 101 and the operating device 102 will be described.

<Constitution of Operating Device>

FIG. 2 is a block diagram illustrating an example of the hardware constitution of the operating device 102 according to the present embodiment. The operating device 102 is constituted by including a CPU (central processing unit) 1301, a RAM (random access memory) 1302, a ROM (read only memory) 1303 and an HDD (hard disk drive) 1304, which is an example of a storing device. The operating device 102 also has an I/O (input/output) unit 1305 and a network I/F (interface) unit 1310. The operating device 102 also has a touch screen controlling unit 1306 and a touch screen 1307 constituted by including an electrostatic capacitance type touch panel, which can detect multi-touch, and a liquid crystal screen (both the panel and screen are not illustrated). Respective components included in the operating device 102 are mutually connected with each other through a system bus 1207.

The CPU 1301 realizes various functions by reading out respective programs such as an OS (operating system), application software and the like from the HDD 1304 and executing those programs. The RAM 1302 serves as a system work memory when the CPU 1301 executes various programs. The ROM 1303 stores programs used for activating a BIOS (Basic Input Output System) and an OS, various setting files and the like. The HDD 1304 stores system software, various data and the like. The network I/F unit 1310 performs interactive communication with an external device including the image forming apparatus 101.

The I/O unit 1305 serves as an interface which controls the input/output of various information. The touch screen controlling unit 1306 controls a display of the touch screen 1307 on the basis of information accepted through the I/O unit 1305. The touch screen controlling unit 1306 also controls the acceptance of an inputting operation (touching operation) to the touch screen 1307 performed by a user.

For example, a GUI (graphical user interface) screen is formed on a liquid crystal screen (display screen) of the touch screen 1307, and various windows, various data and the like, which are necessary for accepting operations instructed from a user, are displayed.

<Constitution of Image Forming Apparatus>

FIG. 3 is a block diagram illustrating an example of the hardware constitution of the image forming apparatus 101 according to the present embodiment. The image forming apparatus 101 is constituted by including a scanner 10, a printer 20, an operating unit 140 and a controller 1200.

The scanner 10 outputs image data obtained by reading an original in accordance with an instruction from the operating unit 140. The scanner 10 has a CPU (not illustrated) used for controlling the scanner 10, an illumination lamp used for reading the original, a scan mirror and the like (not illustrated).

The printer 20 prints the image data, which was read by the scanner 10, on a paper. The printer 20 has a CPU (not illustrated) used for controlling the printer 20, a photosensitive drum, a fixing unit and the like (not illustrated) used for forming and fixing an image.

The operating unit 140 is constituted by including, for example, a displaying section such as a touch screen which can display various information and accept an operation input. The operating unit 140 performs the setting (e.g., the initial setting) of various jobs to be performed by the image forming apparatus 101 on the basis of an operation input instructed from a user. Note that it may be also constituted that the setting of various jobs to be performed by the image forming apparatus 101 is performed by using the operating device 102.

The controller 1200 comprehensively controls the scanner 10, the printer 20, the operating unit 140 and the like. The controller 1200 also controls exchange of information performed with the operating device 102 which is communicatably connected through, for example, the wireless LAN network 105. The controller 1200 also controls exchange of information performed with an external device (not illustrated) to be connected through a public line (WAN (wide area network)) 3001 and a general-purpose computer 103 to be connected through the wired LAN network 104.

Hereinafter, the details of constitution of the controller 1200 will be described.

<Constitution of Controller>

The controller 1200 is constituted by including a CPU 1201, a RAM 1202, a ROM 1203, an HDD 1204, an image bus I/F 1205, an operating unit I/F 1206, a scanner/printer communication I/F 1208, a network unit 1210 and a MODEM 1211. In addition, the controller 1200 has a timer 1212, a device I/F 1220, a RIP (raster image processor) 1260, an image rotating unit 1230 and an image compressing unit 1240. The controller 1200 further includes a wireless communication I/F 1270, a scanner image processing unit 1280, a printer image processing unit 1290, a system bus 1207 and an image bus 2008.

The CPU 1201 comprehensively controls the image forming apparatus 101. The RAM 1202 serves as a system work memory for the purpose of operating the CPU 1201 and also serves as an image memory for the purpose of temporarily storing image data. The ROM 1203 stores a boot program to be executed by the CPU 1201. The HDD 1204, which is an example of a storing device, stores various information such as system software, image data, software counter values and the like.

The image bus I/F 1205, which serves as a bus bridge for converting the data structure, connects the system bus 1207 with the image bus 2008. The system bus 1207 is such a bus which mutually connects the scanner/printer communication I/F 1208, which is communicatably connected with the scanner 10 and the printer 20 respectively, with the CPU 1201 and the like. The image bus 2008 is such a bus which mutually connects the device I/F 1220, which is communicatably connected with the scanner 10 and the printer 20 respectively, with the RIP 1260 and the like and transfers image data at a high speed.

The operating unit I/F 1206 is such an interface which controls exchange of information performed between the operating unit I/F 1206 and the operating unit 140. The network unit 1210 controls the data communication (transmission/reception) to be performed with the general-purpose computer 103 connected through the wired LAN network 104 or other computer terminals provided on the wired LAN network 104. The MODEM 1211 controls the data communication to be performed with an external facsimile apparatus (not illustrated) connected with the public line 3001. The wireless communication I/F 1270 controls the data communication to be performed with the operating device 102 connected through the wireless LAN network 105. The timer 1212 detects whether or not the previously set time has been elapsed.

The scanner/printer communication I/F 1208 performs a synchronous control (a timing control) in the whole printing process from the paper feeding timing to the paper discharging timing after the image formation in the printer 20.

The RIP 1260, which is a raster image processor, expands PDL (page description language) codes included in a printing job received from, for example, the general-purpose computer 103 into a bit map image. The scanner image processing unit 1280 performs such a process of correcting, processing, editing or the like to image data read by the scanner 10. The printer image processing unit 1290 performs such a process of correcting, converting resolution or the like to image data to be output (printed) at the printer 20.

The image rotating unit 1230 performs a rotating process according to the printing setting to the image data to be output (printed) at the printer 20. The image compressing unit 1240 performs a compressing/decompressing process to image data. For example, if the image data is multi-value image data, the compressing/decompressing process of JPEG (Joint Photographic Experts Group) is performed. On the other hand, if the image data is binary image data, the compressing/decompressing process of JBIG (Joint Bi-level Image Experts Group), MMR (Modified Modified READ) or MH (Modified Huffman) is performed.

The device I/F 1220, which is connected with the scanner 10 and the printer 20, performs the synchronous/asynchronous conversion of image data through the image bus 2008.

Incidentally, the controller 1200 records log information when various jobs such as a printing job, a copying job and the like were performed, in the HDD 1204 or the RAM 1202 as job log information. The job log information is, for example, a user name, the number of prints, a distinction between the color printing and the monochrome printing, output attribute information or the like.

A preview image to be displayed on the touch screen 1307 of the operating device 102 is generated by the CPU 1201 on the basis of print data or image data read by the scanner 10. In this manner, the CPU 1201 also functions as a preview image generating unit. The generated preview image is transmitted to the operating device 102 through the wireless communication I/F 1270.

<Functional Constitution of Operating Device>

Figure 4:
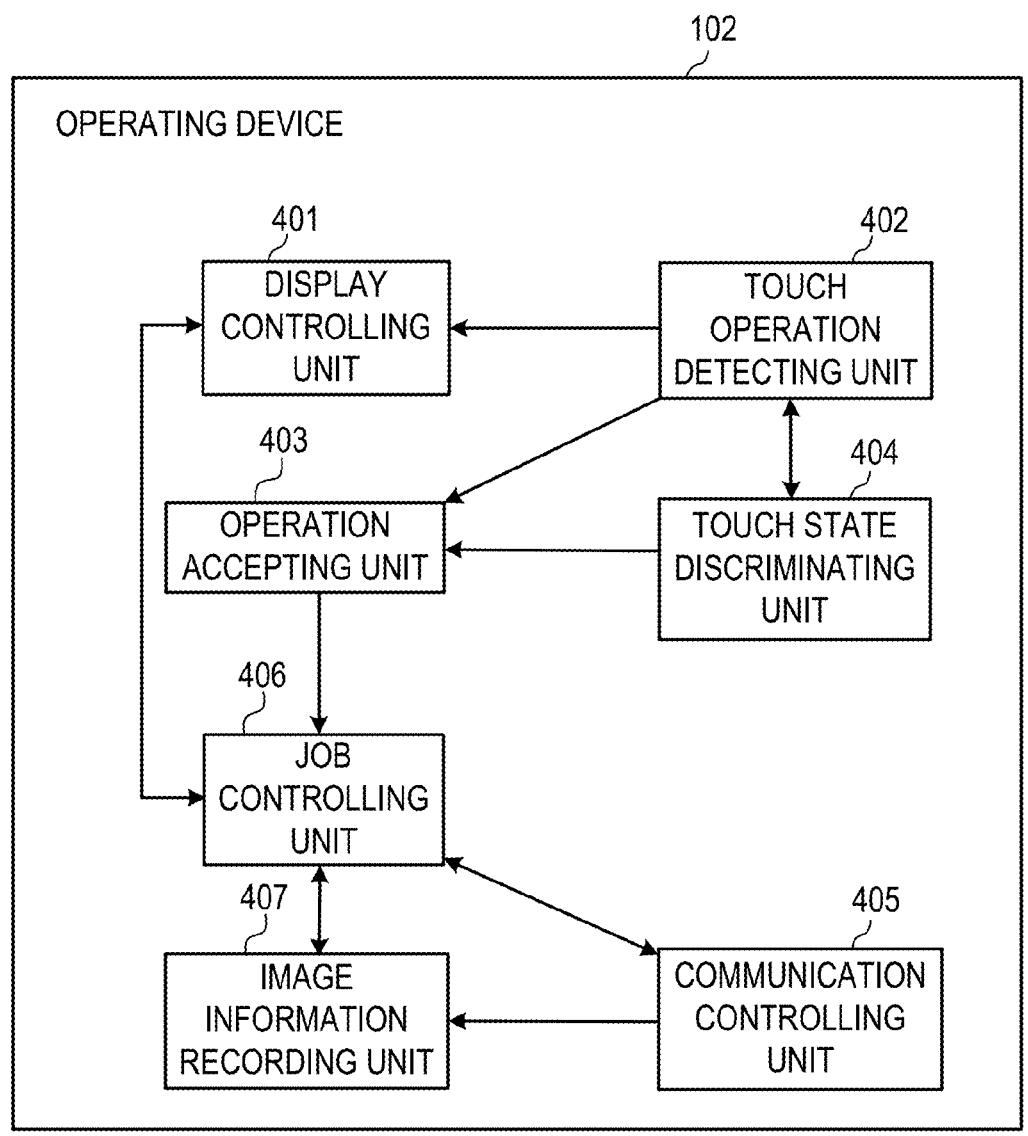
FIG. 4 is a block diagram illustrating an example of the functional constitution of the operating device.

FIG. 4 is a block diagram illustrating an example of the functional constitution of the operating device 102.

Each function of the operating device 102 is realized by a process that the CPU 1301 reads out a job controlling program stored in the HDD 1304 to the RAM 1302 and executes that program. In this way, the operating device 102 functions as an operating unit used for controlling a printing job to be performed by the image forming apparatus 101. Hereinafter, each function will be described in detail.

The operating device 102 is constituted by including a display controlling unit 401, a touch operation detecting unit 402, an operation accepting unit 403, a touch state discriminating unit 404, a communication controlling unit 405, a job controlling unit 406 and an image information recording unit 407.

The display controlling unit 401 updates the displayed content of the touch screen 1307 on the basis of operation information received by the job controlling unit 406 and job information from the image forming apparatus 101 accepted through the communication controlling unit 405. The operation information is, for example, such information of instructing the printing start, interruption, cancellation, the restart after the interruption or the like to the printing job, which is corresponded to the direction of sliding a finger from a point (touch point) touched on the touch screen 1307.

The job information is, for example, such information of indicating a state of the image forming apparatus 101 such as the printing performing, interruption, cancellation, the printing end, the printing restart after occurrence of the paper jam (jam) or the like performed by the image forming apparatus 101. In addition, the job information is such information which further includes a timing of feeding a paper from a paper cassette, a timing of fixing toner, a timing of discharging a paper after the image formation or the like.

For example, in the image forming apparatus 101, the printing of a certain page is assumed to be completed. In this case, the display controlling unit 401 updates the displayed content of the touch screen 1307 adjusting to the timing that a new paper is fed from a paper cassette (not illustrated) of the image forming apparatus 101. The details of a control (displaying control) for updating the displayed content will be described later.

The touch operation detecting unit 402 detects a touch operation to the touch screen 1307 performed by a user through the touch screen controlling unit 1306. Specifically, the touch operation detecting unit 402 detects a touch point of the user and a locus of the touching.

The touch state discriminating unit 404 discriminates whether or not a detected touch state instructs a specific operation on the basis of a detected result of the touch operation detecting unit 402.

The operation accepting unit 403 specifies operation information corresponding to the operation content accepted from the user on the basis of the detected result of the touch operation detecting unit 402 and a discriminated result accepted from the touch state discriminating unit 404. The operation information specified by the operation accepting unit 403 is transferred to the job controlling unit 406.

The operation content is, for example, coordinates of a touch point (touch coordinates) touched on the touch screen 1307 by a fingertip of the user, a locus drawn when the fingertip is slid while keeping the touch or the like. Incidentally, the operation information such as the printing start, interruption, cancellation, the restart after the interruption or the like corresponded to the operation content is previously stored in, for example, the HDD 1304.

In addition, information of instructing a change of the printing speed is also included in the operation information. When the information is specified to be the operation information of changing the printing speed by the operation accepting unit 403, this operation information is transferred to the image forming apparatus 101 through the job controlling unit 406 and the communication controlling unit 405. The image forming apparatus 101 changes the printing speed to the speed corresponding to the accepted operation information.

In addition, this operation information is transferred to the display controlling unit 401 through the job controlling unit 406. The display controlling unit 401 updates the displayed content by such speed corresponding to the changed printing speed.

For example, the preview image displayed on the touch screen 1307 is displayed in such a state of moving on the screen in accordance with the performing state (progress) of a printing job. Therefore, when the printing speed (processing speed) of the image forming apparatus 101 is fast, the preview image displayed on the screen is also quickly moving on the screen in accordance with that speed. That is, there is a case that a user becomes to be in a state, where an operation to the preview image already cannot be performed depending on the timing of updating the displayed content.

The job controlling unit 406 accepts the operation information from the operation accepting unit 403 and accepts job information from the image forming apparatus 101 through the communication controlling unit 405. The job controlling unit 406 also transmits the operation information to the image forming apparatus 101 through the communication controlling unit 405. Accordingly, the content of a printing job to be performed later in the image forming apparatus 101 will be changed.

The job controlling unit 406 performs a control in order that the timing of performing the printing job in the image forming apparatus 101 synchronizes with the timing of updating the displayed content of the touch screen 1307 on the basis of the accepted operation information and the job information. The timing of performing the printing job is, for example, the timing in the image forming apparatus 101 such as the timing of feeding a paper, the timing of fixing an image, the timing of discharging a paper or the like.

The image information recording unit 407 stores a preview image accepted through the communication controlling unit 405 in, for example, the RAM 1302. The communication controlling unit 405 controls exchange of information to be performed between the image forming apparatus 101 and the operating device 102.

Note that the above-described functional constitution of the operating device 102 is only an example, and if it is such the constitution, where the control of the printing job to be performed by the image forming apparatus 101 can be performed by detecting an operation of user and the displayed content can be updated by synchronizing with the performing state of the printing job, such the constitution is available.

In addition, the timing of updating a display screen to be performed by the display controlling unit 401 is not limited to the above timing of feeding a paper, but may be the timing of receiving print data (print image data) transmitted from the general-purpose computer 103.

In addition, it also can be constituted such that the above respective functions of the operating device 102 are realized by the operating unit 140 included in the image forming apparatus 101.

<Display Example of Preview Screen>

Figure 5:
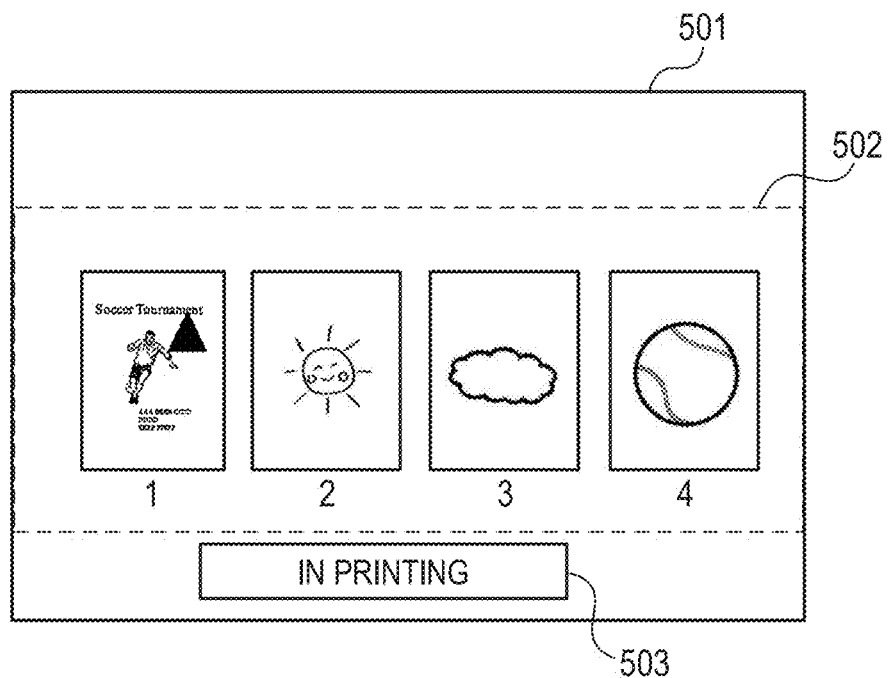
FIG. 5 is a diagram illustrating an example of the configuration of a preview screen.

FIG. 5 is a diagram illustrating an example of the configuration of a preview screen.

A preview screen 501 on the touch screen 1307 is configured by including a preview image display area 502 for displaying a preview image and a job information display column 503 for displaying information concerned with the job as illustrated in FIG. 5. The preview image display area 502 is configured such that four preview images, for example, from page 1 to page 4 (displayed as 1, 2, 3 and 4 in FIG. 5) of the print data can be displayed as illustrated in FIG. 5.

Information concerned with the job in the job information display column 503 is a status of a job which is in performing, the content of an error occurred in performing the printing or the like. In the job information display column 503 illustrated in FIG. 5, an example, where a message of "in printing" which indicates that the printing is currently performed, that is, a fact that the printing is now performing is displayed, is illustrated.

For example, the displaying of a preview image in case of printing data received from the general-purpose computer 103 is performed by an operation that a user touches a preview instruction button (not illustrated) displayed on a display screen of the touch screen 1307. As a result, a preview image is displayed on the print preview screen 501.

In addition, the displaying of a preview image in case of performing the printing by reading an original by the scanner 10 is also similarly performed.

<Display Controlling Example of Preview Screen when Printing Performing is Instructed>

Figure 6A:
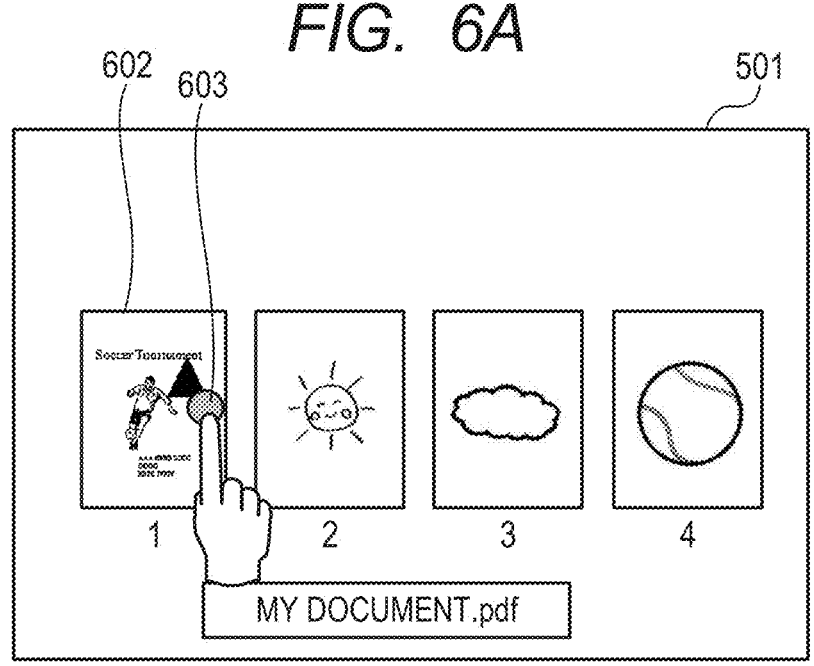
FIGS. 6A and 6B are diagrams for describing a printing performing instruction to be issued through preview images displayed on the preview screen.
Figure 6B:
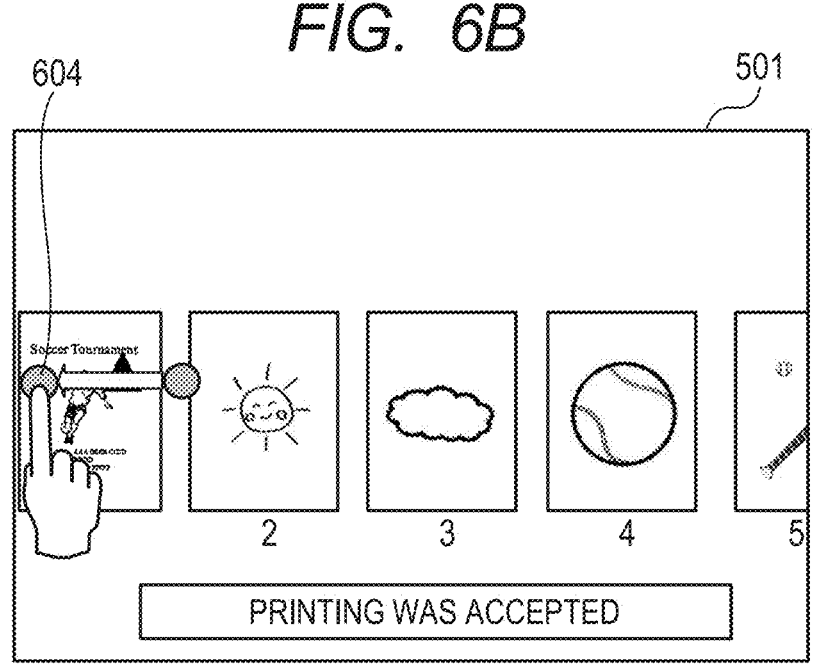

FIGS. 6A and 6B are diagrams for describing a printing performing instruction to be issued through preview images displayed on the preview screen 501.

In the preview screen 501 illustrated in FIG. 6A, preview images of the first four pages of print data (my document .pdf) are displayed. A preview image 602 displayed on the preview screen 501 is a preview image of the first page of the print data, and the printing performing is instructed by operating this preview image 602. In the job information display column 503, a file name (my document .pdf) of the print data is displayed.

As for an instruction of the printing performing, a touch point 603 displayed on the preview image 602 is touched as illustrated in FIG. 6A, and a drag operation is performed to a touch point 604 illustrated in FIG. 6B while keeping a touching state. Then, the touching state is released after performing the drag operation to the touch point 604. In response to the release of the touching state, the image forming apparatus 101 starts the printing of print data. Note that the touch point 604 positions at a left end portion of the preview screen 501. In addition, as illustrated in FIG. 6B, a display position of the preview image 602 changes in accordance with the drag operation of user, and display positions of other preview images also change in linkage with the above change. That is, the displayed content of the preview screen 501 is updated in linkage with the performing state (printing operation) of the printing job.

In the job information display column 503, as illustrated in FIG. 6B, for example, a message of "the printing was accepted", that is, information, which indicates a fact that an instruction of the printing performing was accepted, is displayed.

As for the discrimination whether an operation of user is a printing performing instruction or an operation for the purpose of changing a display position of the preview image, it is discriminated whether or not the touch release after the drag operation is performed at an end portion of the print preview screen 501. Specifically, when the touch operation detecting unit 402 detected that the touch release was performed after the drag operation of user reached the end portion (left end portion) of the print preview screen 501, it is discriminated that the operation of user is the printing performing instruction.

In the above example, an operation in a case that the preview image 602, that is, a preview image of the first page in the print data is operated and the printing of subsequent pages is performed has been described. Besides this, an operation can be performed such that the printing is started from an arbitrary page. Specifically, in a case that a preview image (2) displayed on the right side of the preview image 602 illustrated in FIG. 6A and the subsequent preview images are required to be printed, the similar operation may be performed by touching the preview image (2).

A pattern of the printing performing instruction is not limited to the above example but may be allowed if the operation is, for example, such an operation, of which a form can be identified between an operation of instructing the printing performing and an operation of moving a display position of the preview image.

<Display Controlling Example of Preview Screen Linking with Printing Operation>

Figure 7A:
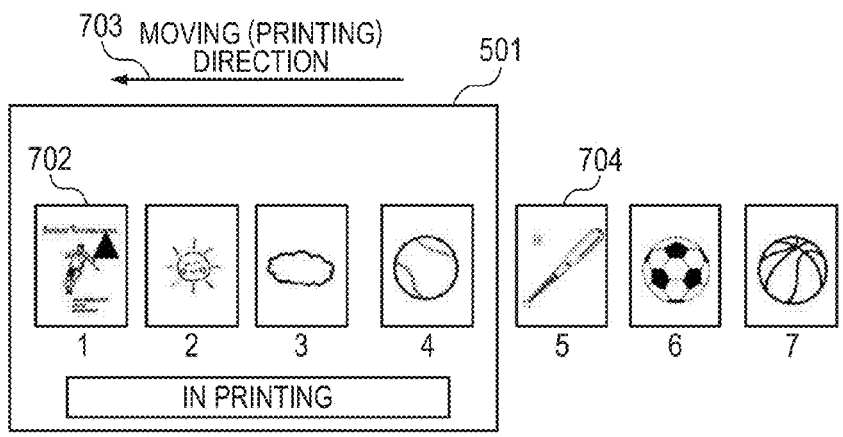
FIGS. 7A, 7B and 7C are diagrams for describing an operation in which the display content of the preview screen is updated in linkage with a performing state of a printing job.
Figure 7B:
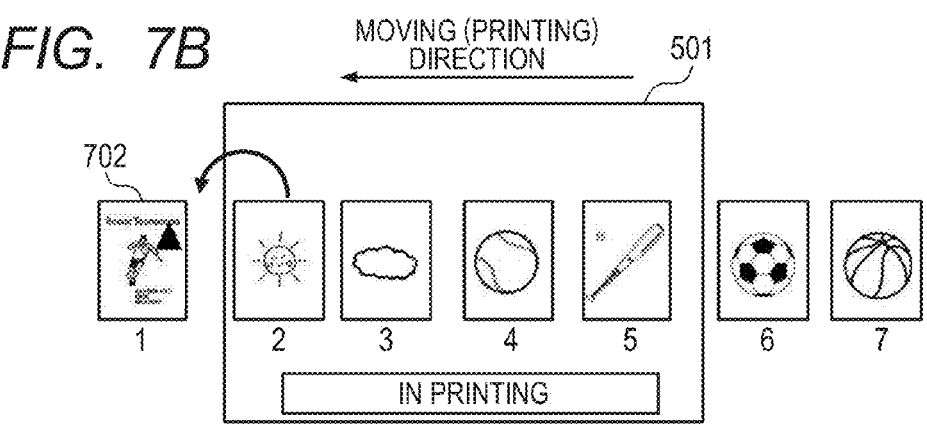
Figure 7C:
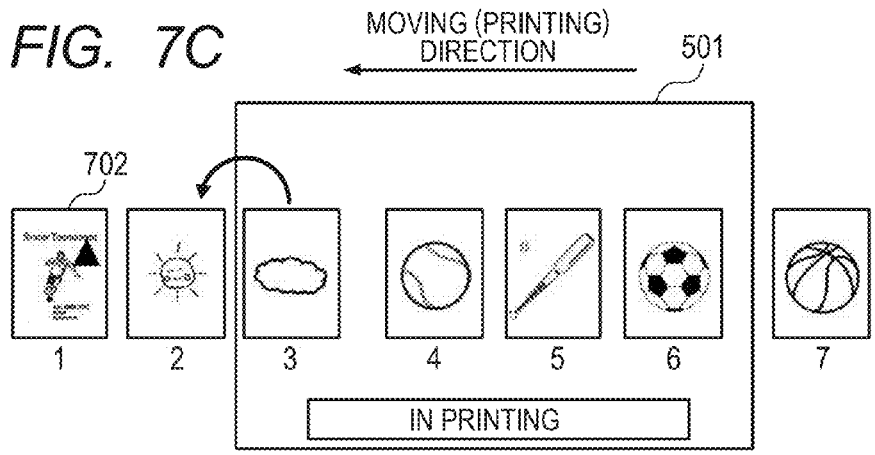

FIGS. 7A, 7B and 7C are diagrams for describing an operation in which the displayed content of the preview screen 501 is updated in linkage with the printing operation.

In the preview screen 501 illustrated in FIG. 7A, preview images of the first four pages of print data (my document .pdf) are displayed. A preview image 702 displayed on the preview screen 501 is a preview image of the first page of the print data. Preview images outside the preview screen 501 are preview images from fifth page to seventh page of the print data. Note that from a preview image 704 at the fifth page to a preview image at the seventh page are not displayed on the print preview screen 501.

Display positions of the respective preview images displayed on the print preview screen 501 are controlled to move toward the direction of an arrow line illustrated in FIG. 7A in accordance with progress of the printing job. Specifically, the display controlling unit 401 updates the displayed content of the print preview screen 501 synchronizing with the timing of accepting the job information (end of the printing), which the job controlling unit 406 accepted through the communication controlling unit 405.

For example, a preview image of the printing completed print data is assumed to be the preview image 702 illustrated in FIG. 7A. In this case, the preview image 702 moves in such a way as to be discharged from a left end portion of the preview image 501 as illustrated in FIG. 7B, and thereafter, the preview image 702 is completely deleted from the preview screen 501. In accordance with this situation, a preview image of new page, for example, a preview image 704 moves in such a way as to enter from a right end portion of the preview screen 501, and thereafter the preview image 704 is displayed on the preview screen 501 (FIG. 7B).

In the update of the preview screen 501, it is controlled that only the number of preview images, which correspond to the number of pages to be printed on one piece of paper, are moved on the basis of layout information of the printing setting accepted by the job controlling unit 406. Specifically, as illustrated in FIG. 7C, in case of the printing layout setting of forming a plurality of images to one piece of paper, for example, such a case, where the printing setting is the double-sided printing or the 2-in-1 reduction layout printing, it is controlled that two preview images are moved as one pair.

A user can intuitively grasp the progress of the printing by a process that the displayed content of the print preview screen 501 is controlled in this manner.

<Display Controlling Example of Preview Screen when Jam Occurs>

Figure 8A:
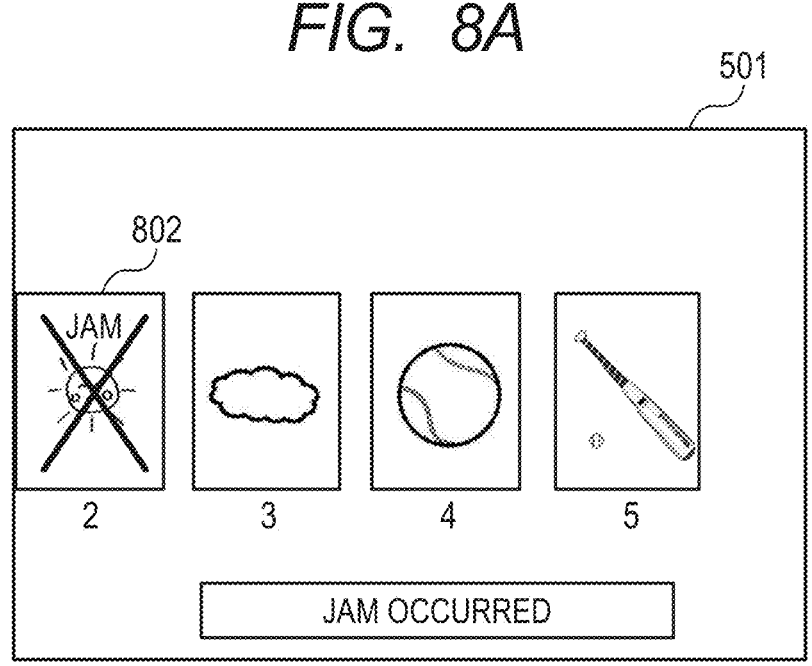
FIGS. 8A and 8B are diagrams for describing a display example of the preview screen at the time when a jam occurs while the printing job is being performed.
Figure 8B:
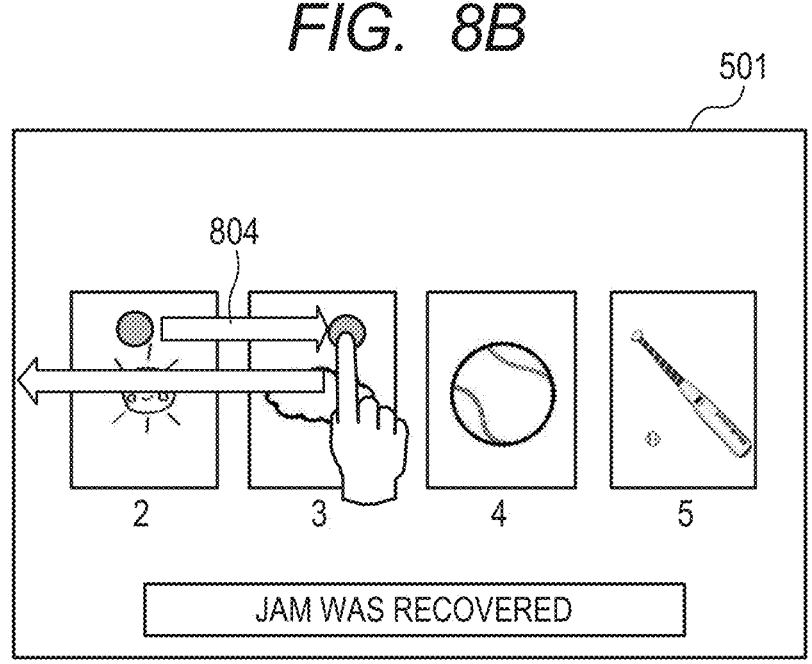

FIGS. 8A and 8B are diagrams for indicating a display example of the preview screen at the time when the paper jam (jam) occurs while the printing job is being performed. That is, the displayed content of the preview screen is updated in linkage with the performing state of the printing job. Incidentally, a fact that the jam occurred in the image forming apparatus 101 and a jammed paper was removed can be detected by a sensor (not illustrated) included in the image forming apparatus 101.

In the preview screen 501 illustrated in FIG. 8A, preview images from second page to fifth page of print data are displayed. A preview image 802 displayed on the preview screen 501 is a preview image of the second page of the print data.

For example, when the jam occurred in the course of printing the second page of the print data, the printing job is interrupted and it is controlled that a mark "x" is displayed on the preview image 802, which is the preview image at the second page, as illustrated in FIG. 8A. Specifically, the display controlling unit 401 updates the displayed content of the print preview screen 501 synchronizing with the timing of accepting job information (occurrence of jam), which the job controlling unit 406 accepted through the communication controlling unit 405. Further, in the job information display column 503, information (jam occurred), which indicates a fact that the jam occurred, is displayed. In this manner, a user can intuitively grasp the occurrence of jam by a process that the displayed content of the print preview screen 501 is controlled.

When it was detected that a jammed paper was removed by the user, the displayed content of the preview screen 501 is updated such that the preview image 802 which is in the state of not having the mark "x" is displayed instead of the preview image 802 to which the mark "x" is added. Specifically, the display controlling unit 401 updates the displayed content of the print preview screen 501 synchronizing with the timing of accepting job information (discharging of jammed paper), which the job controlling unit 406 accepted through the communication controlling unit 405. Further, in the job information display column 503, information (jam was recovered), which indicates a fact that the jammed paper was removed, is displayed. In this manner, a user can intuitively grasp a fact of correctly coping with the occurrence of jam by a process that the displayed content of the print preview screen 501 is controlled.

An instruction of the restart of a printing job (printing restart) after that the jammed paper was removed by the user can be performed by a touch and drag operation 804 as illustrated in FIG. 8B. The touch and drag operation 804 is such an operation, where a preview image (2) of the first page in case of restarting the printing is touched and the drag operation is once performed toward the right direction and thereafter the drag operation is further performed toward a left end portion of the preview screen 501 similar to a case of the printing performing instruction and then the touching state is released. In response to the release of the touching state, the operating device 102 transmits a printing restart instruction to the image forming apparatus 101. That is the printing job is changed from the interruption state to the restart state.

<Display Controlling Example of Preview Screen when Printing Interruption is Instructed>

Figure 9A:
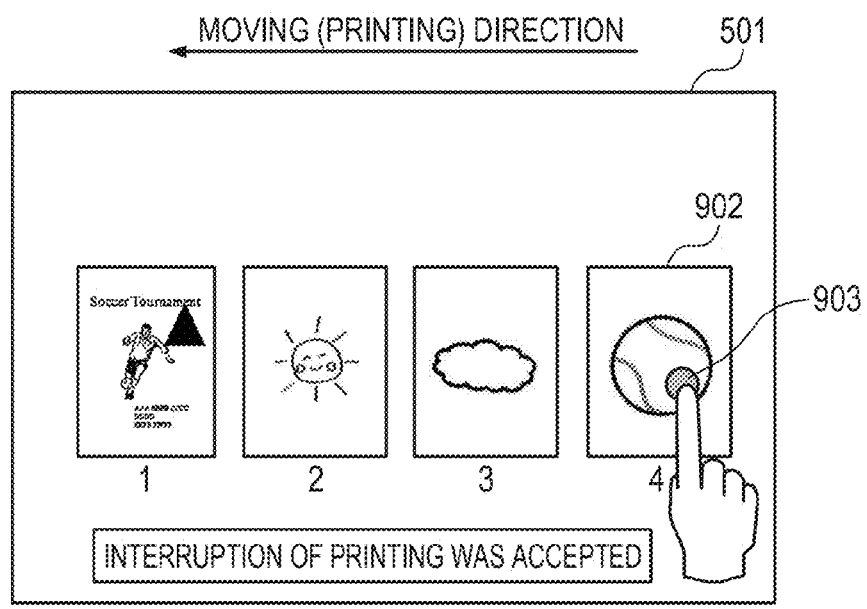
FIGS. 9A and 9B are diagrams for describing a printing interrupting instruction to be issued through the preview images displayed on the preview screen.
Figure 9B:
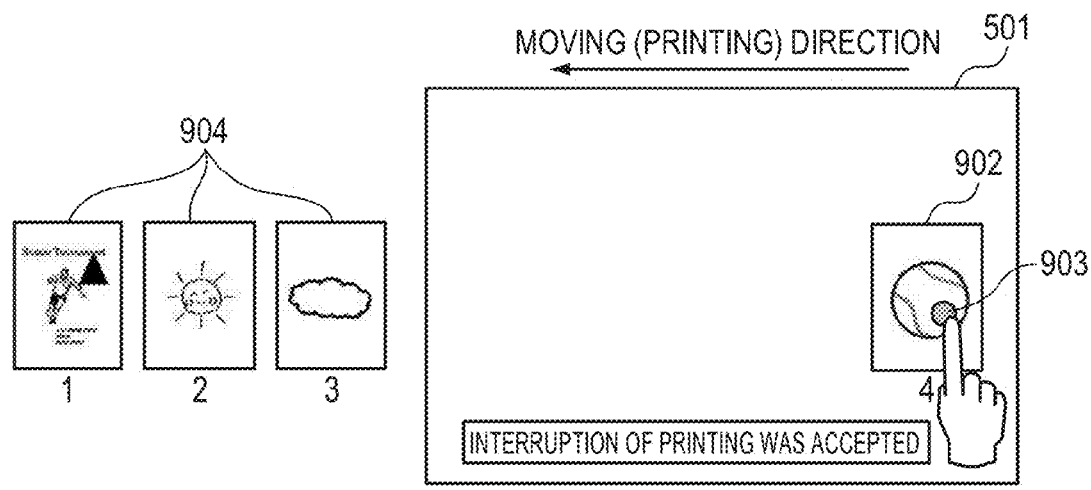

FIGS. 9A and 9B are diagrams for describing a printing interrupting instruction to be issued through the preview images displayed on the preview screen 501.

In the preview screen 501 illustrated in FIG. 9A, preview images of the first four pages of print data (my document) are displayed. For example, when the printing of the fourth and subsequent pages of the print data is desired to be interrupted, the printing interruption for the fourth and subsequent pages is instructed by an operation that a touch point 903 on a preview image 902, which is a preview image of the fourth page, is continuously touched for a predetermined time (e.g., three seconds). Specifically, operation information (printing interruption) specified by the operation accepting unit 403 is transferred to the image forming apparatus 101 through the job controlling unit 406 and the communication controlling unit 405. Further, in the job information display column 503, information (interruption of printing was accepted), which indicates a fact that the printing was interrupted, is displayed.

When the printing of the preview image 902 and subsequent images was interrupted, as illustrated in FIG. 9B, a preview image (preview image 904) previous to the preview image 902 is deleted from the preview screen 501 due to the printing end. In this manner, a user can intuitively grasp a fact about the printing was interrupted at which page by a process that the displayed content of the print preview screen 501 is controlled.

Note that the printing which was interrupted can be restarted by performing an operation which is similar to the printing performing instruction.

<Display Controlling Example of Preview Screen when Printing Cancellation is Instructed>

Figure 10A:
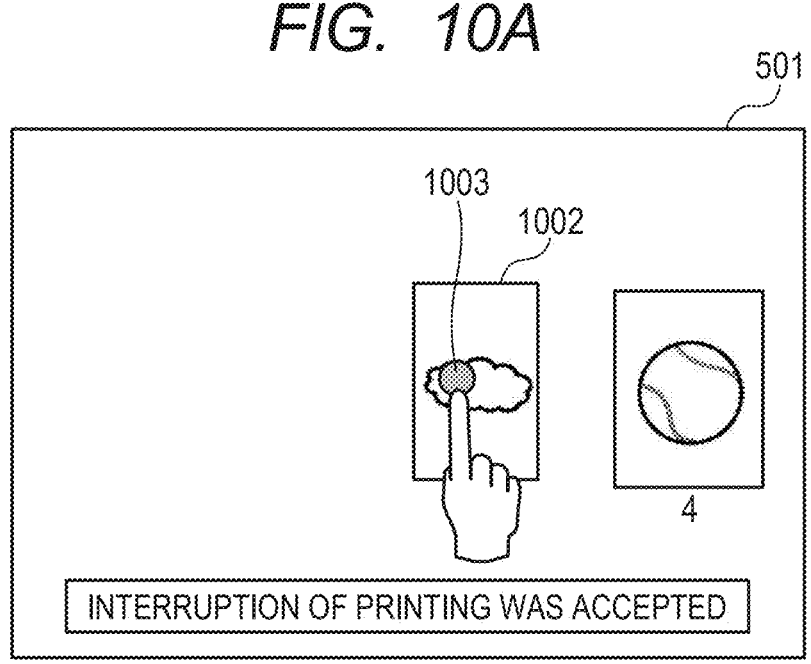
FIGS. 10A and 10B are diagrams for describing a printing cancelling instruction to be issued through the preview images displayed on the preview screen.
Figure 10B:
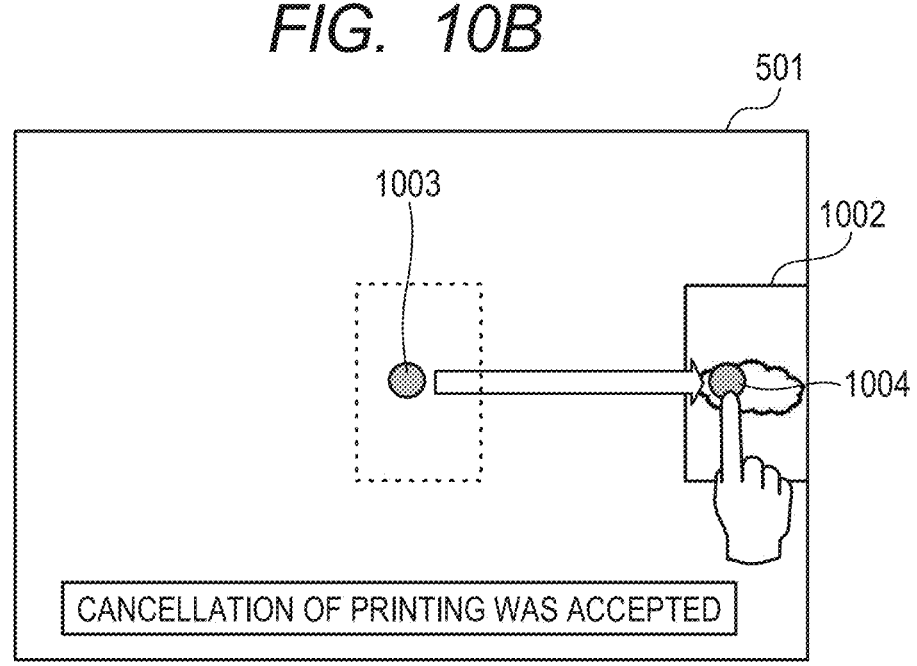

FIGS. 10A and 10B are diagrams for describing a printing cancelling instruction to be issued through the preview images displayed on the preview screen 501.

In the preview screen 501 illustrated in FIG. 10A, a preview image 1002 is displayed under the state that the printing is interrupted, and an operation in case of cancelling the printing of the preview image 1002 and subsequent images will be described.

As for the printing cancelling instruction, a touch point 1003 displayed on the preview image 1002 is touched as illustrated in FIG. 10A, and a drag operation is performed to a touch point 1004 illustrated in FIG. 10B while keeping a touching state. Then, the touching state is released after performing the drag operation to the touch point 1004. In response to the release of the touching state, the image forming apparatus 101 cancels the printing of print data. In addition, as illustrated in FIG. 10B, a display position of the preview image 1002 changes in accordance with the drag operation of user, and display positions of other preview images also change in linkage with the above change.

In the job information display column 503, for example, information of "cancellation of the printing was accepted", which indicates a fact that a printing canceling instruction was accepted, is displayed as illustrated in FIG. 10B.

As for the discrimination whether an operation of user is the printing cancelling instruction or an operation for the purpose of changing a display position of the preview image, it is discriminated whether or not the touch release after the drag operation is performed at a left end portion of the print preview screen 501. Specifically, when the touch operation detecting unit 402 detected that the touch release was performed after the drag operation of user reached an end portion (right end portion) of the preview screen 501, it is discriminated that it was the printing canceling instruction.

In the above example, an operation in a case that the preview image 1002, that is, a preview image of a page, which was interrupted to perform the printing, is operated and the printing of subsequent pages is cancelled has been described. Besides this case, it can be also operated such that the printing of an arbitrary page and subsequent pages is cancelled when the printing is currently performed.

A pattern of the printing cancelling instruction is not limited to the above example but may be allowed if the operation is, for example, such an operation, of which a form can be identified between an operation of instructing the printing cancellation and an operation of moving a display position of a preview image.

<Job Control Accepting Operation Flow>

Figure 11:
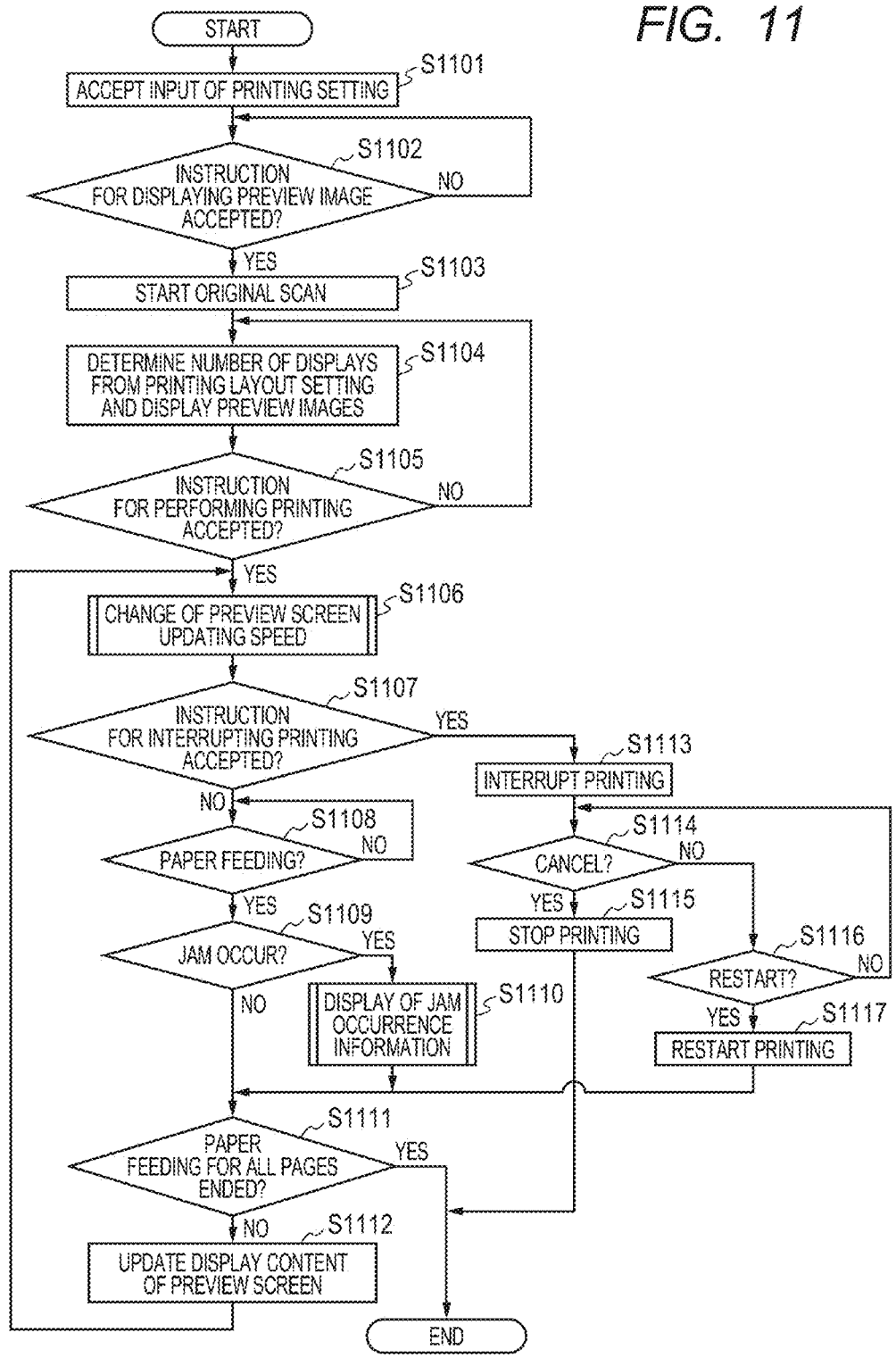
FIG. 11 is a flow chart for indicating an example of a processing procedure to be performed when the printing job is controlled.

FIG. 11 is a flow chart indicating an example of a processing procedure of the printing job control. A case that an original is read by the scanner 10 provided at the image forming apparatus 101 and image data which was read is printed by the printer 20 is exemplified and the description thereof will be continued.

The CPU 1301 accepts an input of the printing setting from a user (S1101). The accepted printing setting is transmitted to the image forming apparatus 101 as printing setting information.

The CPU 1301 discriminates whether or not a preview image displaying instruction is accepted from a user (S1102). When the preview image displaying instruction was accepted (Yes in S1102), the CPU 1301 instructs to start an original scan (S1103). Otherwise (No in S1102), a stand-by state is kept until when the preview image displaying instruction is accepted.

The CPU 1301 accepts a preview image, which the image forming apparatus 101 generated on the basis of image data of the original scanned in a process in S1103, and displays the accepted preview image on the preview screen 501 (S1104). Note that the preview image is generated in accordance with the printing setting accepted in a process in S1101. For example, in a case that the printing setting is the double-sided printing or the 2-in-1 reduction printing layout setting, preview images, of which the number is suitable in moving two preview images as one pair, are displayed.

The CPU 1301 discriminates whether or not the printing performing instruction (refer to FIGS. 6A and 6B) is accepted (S1105). When it was discriminated that the printing performing instruction was accepted (Yes in S1105), the CPU 1301 notifies an instruction of starting to perform the printing job to the image forming apparatus 101. At the same time, the update of the displayed content of the preview screen 501 is started in linkage with the performing state of the printing job (refer to FIGS. 7A, 7B and 7C). Further, the CPU 1301 accepts a change of the update speed of the preview screen 501 (S1106). The details of this process will be described later with reference to FIG. 13 and FIG. 14.

The CPU 1301 discriminates whether or not a printing interrupting instruction (refer to FIGS. 9A and 9B) is accepted (S1107). In a case that the printing interrupting instruction was not accepted (No in S1107), the CPU 1301 discriminates whether or not the paper feeding is started (S1108). When it was discriminated that the paper feeding is not started (No in S1108), the CPU 1301 keeps a stand-by state for the process until when the paper feeding is started. When it was discriminated that the paper feeding is started (Yes in S1108), the CPU 1301 discriminates whether or not the jam occurrence is detected (S1109). When it was discriminated that the jam occurrence was detected (Yes in S1109), the CPU 1301 updates the displayed content of the preview screen 501 to the displayed content (refer to FIGS. 8A and 8B) of indicating the jam occurrence (S1110). The details of this process will be described later with reference to FIG. 12.

The CPU 1301 discriminates whether or not the paper feeding for all pages corresponding to the printing setting is completed (S1111). In a case that the paper feeding for all pages was not completed (No in S1111), the displayed content of the preview screen 501 is updated in linkage with the performing state of the printing job (S1112). Otherwise (Yes in S1111), the CPU 1201 ends a series of processes.

In a case that the printing interrupting instruction was accepted in a process in S1107 (Yes in S1107), the CPU 1301 notifies the printing interrupting instruction to the image forming apparatus 101. Further, the CPU 1301 updates the displayed content of the preview screen 501 to the displayed content (refer to FIGS. 9A and 9B) of indicating the printing interruption (S1113).

The CPU 1301 discriminates whether or not a printing cancelling instruction (refer to FIGS. 10A and 10B) is accepted (S1114). In a case that the printing cancelling instruction was accepted (Yes in S1114), the CPU 1301 cancels all the subsequent printing (51115). Otherwise (No in S1114), the CPU 1301 discriminates whether or not the printing restart instruction (refer to FIGS. 6A and 6B and FIGS. 9A and 9B) was accepted (S1116). When the printing restart instruction was accepted (Yes in S1116), the CPU 1301 notifies the printing restart instruction to the image forming apparatus 101 (S1117). Otherwise (No in S1116), a flow returns to a process in S1114.

<Processing Flow when Jam Occurred>

Figure 12:
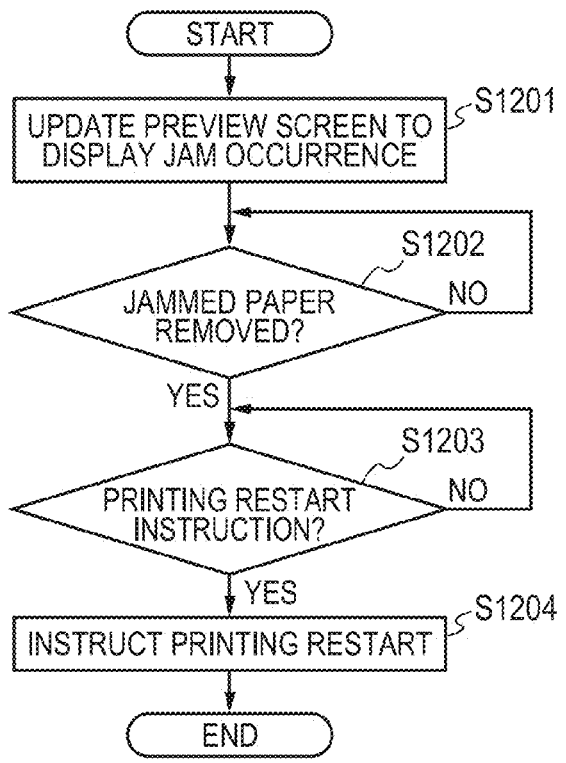
FIG. 12 is a flow chart for indicating an example of a processing procedure to be performed when the jam occurred.

FIG. 12 is a flow chart indicating the details of a processing procedure when the jam occurred (FIG. 11, S1110). The description will be continued with reference to a display control of a preview screen when the jam occurred already described in FIGS. 8A and 8B.

When job information of jam occurrence was accepted from the image forming apparatus 101, the CPU 1301 updates the displayed content of the print preview screen 501 to the displayed content of indicating the jam occurrence (S1201).

The CPU 1301 discriminates whether or not a jammed paper was removed (S1202). Specifically, it is discriminated according to a fact whether or not job information indicating that the jammed paper was removed by a user was accepted from the image forming apparatus 101. When it was discriminated that the jammed paper was removed (Yes in S1202), the CPU 1301 discriminates whether or not a printing restart instruction was accepted (S1203). When the printing restart instruction was accepted (Yes in S1203), the CPU 1301 notifies the printing restart instruction to the image forming apparatus 101 (S1204).

<Display Controlling Example of Preview Screen when Change of Update Speed is Instructed>

Figure 13:
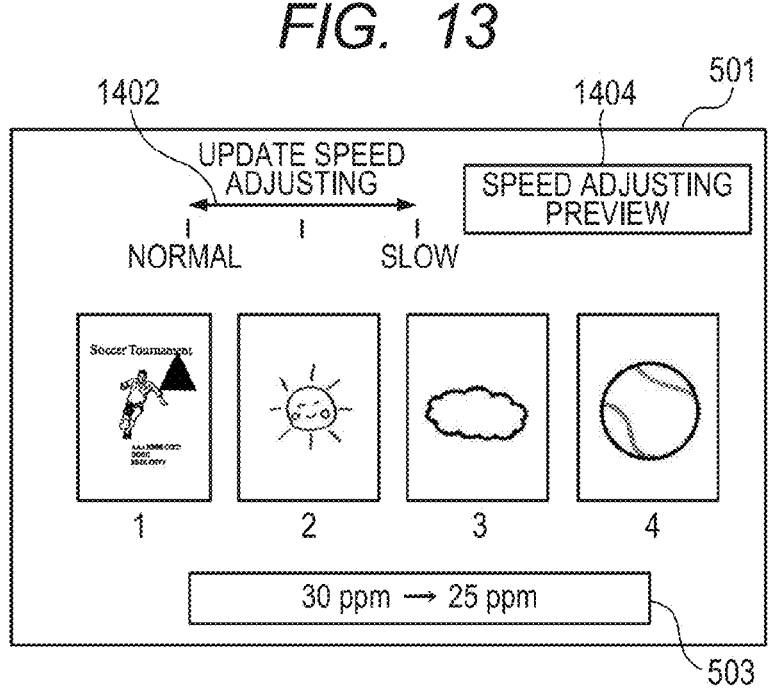
FIG. 13 is a diagram for describing an operation for changing updating speed of the preview screen which is updated in linkage with a printing operation.

FIG. 13 is a diagram for describing an operation for changing the update speed of the preview screen 501 which is updated in linkage with a printing operation.

In the preview screen 501 illustrated in FIG. 13, an update speed adjusting slider 1402 used for adjusting the update speed of this screen and a speed adjusting preview button 1404 used for previewing the update speed after the adjustment are displayed. Further, in the job information display column 503, information (30 ppm to 25 ppm), which indicates the update speed before the adjustment and update speed after the adjustment, is displayed.

A user can change (adjust) the moving speed of a preview image on the preview screen 501 to the desired speed by operating the update speed adjusting slider 1402. As for the update speed adjusting slider 1402 illustrated in FIG. 13, the adjustment can be performed, as an example, within a range from "normal (e.g., 30 ppm)" to "slow (e.g., 25 ppm)".

As for the timing that a user performs update speed adjustment, for example, the adjustment can be performed when the printing setting is input (FIG. 11, S1101) or can be performed in the course of performing a printing job.

<Processing Flow when Update Speed of Preview Screen is Changed>

FIG. 14 is a flow chart indicating the details of a processing procedure of a change of update speed (FIG. 11, S1106) of the preview screen 501. Note that a process in S1106 is the change of update speed to be performed in the course of performing a printing job. The CPU 1301 functions as an adjusting unit which changes the update speed.

The CPU 1301 discriminates whether or not an update speed changing instruction is accepted from a user (S1301). When the update speed changing instruction was accepted (Yes in S1301), the CPU 1301 performs the update of the preview screen 501 by the changed update speed and notifies the changed update speed to the image forming apparatus 101 (S1302). In the image forming apparatus 101 which received the notification, the printing speed of a printing job to be performed thereafter is changed to the speed corresponding to the changed update speed.

The CPU 1301 displays information, which indicates the update speed before the adjustment and the update speed after the adjustment, in the job information display column 503 (S1303).

As for a change of the printing speed of the image forming apparatus 101 according to the change of the update speed, such a speed adjustment which keeps a long paper feeding interval is performed by adjusting the timing of feeding papers in the printing job in response to, for example, acceptance of a notification of the change of the printing speed.

In this manner, in the image forming apparatus 101 of the present embodiment, an instruction of interrupting or cancelling a printing job and an instruction of restarting the printing after the interruption can be performed by operating a preview image through the operating device 102. According to this operation, a user can instruct the change of the content of the printing job every operation while intuitively grasping the performing state of the printing job in the image forming apparatus 101 by visually recognizing a display screen of the operating device 102.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-258059, filed Dec. 13, 2013, which is hereby incorporated by reference wherein in its entirety.

REFERENCE SIGNS LIST

101 . . . image forming apparatus
102 . . . operating device
104 . . . wired LAN
105 . . . wireless LAN
501 . . . preview screen
502 . . . preview image display area
503 . . . job information display area
602, 702, 704, 802, 902, 904 . . . preview image
603, 604, 903, 1003, 1004 . . . touch point
804 . . . touch and drag operation
A, B . . . user
S . . . image forming system

The invention claimed is:

1. An operating device comprising:
a display;
one or more memories that store a set of instructions; and
one or more processors that execute the instructions to perform the following steps:
display a plurality of images within a preview display area on the display;
receive a printing instruction for a displayed image; and
change, in accordance with a progress of a printing process based on the printing instruction, a display position of the images such that some images of the plurality of images exits from the preview display area and other images of the plurality of images move within the preview display area,
wherein the change of the display position of the images is stopped, in accordance with occurrence of a printing error.

2. A controlling method for an operating device, comprising:
displaying a plurality of images within a preview display area;
receiving a printing instruction for a displayed image;
changing, in accordance with a progress of a printing process based on the printing instruction, a display position of the images such that some images of the plurality of images exits from the preview display area and other images of the plurality of images move within the preview display area; and
stopping, in accordance with occurrence of a printing error, the change of the display position of the images.

3. The controlling method according to claim 2, wherein, in accordance with the progress of the printing process, the changing changes the display position of the images such that an image not displayed within the preview display area enters the preview display area.

4. The controlling method according to claim 2, wherein, in a printing layout setting for printing at least two images to one paper, the changing changes the display position of the images such that the at least two images move as a set.

5. The controlling method according to claim 2, further comprising receiving a designation of, among the plurality of images displayed within the preview display area, the image for which printing is interrupted, wherein the changing changes the display position of the images so as to stop the moving of the designated image and move the image other than the designated image.

6. The controlling method according to claim 2, wherein a display content within the preview display area is updated according to timing of performing paper feeding.

7. The controlling method according to claim 2, wherein a display content within the preview display area is updated according to timing of performing image fixing.

8. The controlling method according to claim 2, wherein a display content within the preview display area is updated according to timing of performing paper discharging.

9. The controlling method according to claim 2, wherein the plurality of images to be displayed within the preview display area are images of a plurality of pages in printing data.

10. The controlling method according to claim 2, further comprising detecting a touch operation by a user.

11. The controlling method according to claim 10, further comprising receiving, in a case where an operation of dragging at least one of the plurality of images displayed within the preview display area to a predetermined direction is detected, the operation as the printing instruction for said image.

12. The controlling method according to claim 10, further comprising receiving, in a case where an operation of touching at least one of the plurality of images displayed within the preview display area for a predetermined time is detected, the operation as a printing interrupting instruction for said image.

13. The controlling method according to claim 10, further comprising receiving, in a case where an operation of dragging at least one of the plurality of images displayed within the preview display area to a predetermined direction is detected, the operation as a printing cancelling instruction for an image subsequent to said image.

14. A non-transitory computer-readable storage medium which stores a program for causing a computer to perform a controlling method for an operating device, the program comprising:
code for displaying a plurality of images within a preview display area;
code for receiving a printing instruction for a displayed image;
code for changing, in accordance with a progress of a printing process based on the printing instruction, a display position of the images such that some images of the plurality of images exits from the preview display area and other images of the plurality of images move within the preview display area; and
code for stopping, in accordance with occurrence of a printing error, the change of the display position of the images.

15. A controlling method for an operating device, comprising:
displaying a plurality of images within a preview display area;
receiving a printing instruction for a displayed image; and
changing, in accordance with a progress of a printing process based on the printing instruction, a display position of the images such that some images of the plurality of images exits from the preview display area and other images of the plurality of images move within the preview display area,
wherein a display content within the preview display area is updated according to any one of a timing of performing paper feeding, a timing of performing image fixing and a timing of performing paper discharging.

16. A controlling method for an operating device, comprising:
displaying a plurality of images within a preview display area;
receiving, in a case where an operation of dragging at least one of the plurality of images displayed within the preview display area to a predetermined direction is detected, the operation as a printing instruction for the displayed image; and
changing, in accordance with a progress of a printing process based on the printing instruction, a display position of the images such that some images of the plurality of images exits from the preview display area and other images of the plurality of images move within the preview display area.

17. An operating device comprising:
a display;
one or more memories that stores a set of instructions; and
one or more processors that execute the instructions to perform the following steps:
display a plurality of images within a preview display area on the display;
receive a printing instruction for a displayed image; and
change, in accordance with a progress of a printing process based on the printing instruction, a display position of the images such that some images of the plurality of images exits from the preview display area and other images of the plurality of images move within the preview display area,
wherein a display content within the preview display area is updated according to any one of a timing of performing paper feeding, a timing of performing image fixing and a timing of performing paper discharging.

18. An operating device comprising:
a display;
one or more memories that stores a set of instructions; and
one or more processors that execute the instructions to perform the following steps:
display a plurality of images within a preview display area on the display;
receive, in a case where an operation of dragging at least one of the plurality of images displayed within the preview display area to a predetermined direction is detected, the operation as a printing instruction for the displayed image; and
change, in accordance with a progress of a printing process based on the printing instruction, a display position of the images such that some images of the plurality of images exits from the preview display area and other images of the plurality of images move within the preview display area.

* * * * *